(12) United States Patent
Barel (10) Patent No.: US 12,276,544 B2
(45) Date of Patent: Apr. 15, 2025

(54) DETERMINING USER PROXIMITY USING AMBIENT LIGHT SENSOR

(71) Applicant: Microsoft Technology Licensing, LLC, Redmond, WA (US)

(72) Inventor: Eliyahu Barel, Rosh-HaAyin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 17/229,648

(22) Filed: Apr. 13, 2021

(65) Prior Publication Data
US 2022/0326073 A1    Oct. 13, 2022

(51) Int. Cl.
*G01J 1/42*     (2006.01)
*G06F 3/041*    (2006.01)
*G06F 3/0488*   (2022.01)

(52) U.S. Cl.
CPC .......... *G01J 1/4204* (2013.01); *G06F 3/0412* (2013.01); *G06F 3/0488* (2013.01)

(58) Field of Classification Search
CPC ...... G01J 1/4204; G06F 1/3262; G06F 1/325; G06F 1/3215; G06F 1/1698; G06F 3/0488; G06F 3/0412; G06F 1/3209; G06F 1/1684; G06F 1/1686; G06F 1/3231; G06F 1/3265; H04M 1/72454; H04M 1/724631; H04M 2250/22; H04W 52/0245
See application file for complete search history.

(56) References Cited

U.S. PATENT DOCUMENTS

| | | |
|---|---|---|
| 2014/0120891 A1 | 5/2014 | Chen et al. |
| 2014/0220959 A1 | 8/2014 | Mao et al. |
| 2016/0072944 A1* | 3/2016 | Noda ............... H04M 1/724 455/566 |
| 2017/0092228 A1* | 3/2017 | Cote ............... G09G 3/20 |

FOREIGN PATENT DOCUMENTS

| | | |
|---|---|---|
| CN | 108513014 B | 3/2021 |
| EP | 2720445 A1 | 4/2014 |

OTHER PUBLICATIONS

"International Search Report and Written Opinion Issued in PCT Application No. PCT/US22/021448", Mailed Date: Jun. 9, 2022, 12 Pages.

* cited by examiner

*Primary Examiner* — Yaron Cohen
(74) *Attorney, Agent, or Firm* — Alleman Hall & Tuttle LLP (57) ABSTRACT

One example provides a display device comprising a display panel, a touch sensor, an ambient light sensor, a processor, and storage. The storage comprises instructions executable by the processor to monitor an ambient light signal received from the ambient light sensor, detect, in combination with a call event, a threshold change in the ambient light signal that is indicative of the display device being proximate to a body of a user, and based at least on detecting the threshold change in the ambient light signal, modify an operation of the display device.

14 Claims, 6 Drawing Sheets

DETERMINING USER PROXIMITY USING AMBIENT LIGHT SENSOR

BACKGROUND

A mobile communications device may include a proximity sensor to determine when a user is holding the device close to their face during a call. Such proximity data can be used to control device operation while the device is proximate to the user's face. For example, the mobile device may disable a display touch sensor and/or reduce a display brightness during the call based upon proximity data. Proximity sensors are commonly positioned behind a bezel that at least partially surrounds a display screen of a device.

SUMMARY

Examples are disclosed that relate to the use of an ambient light sensor for proximity detection. One example provides a display device comprising a display panel, a touch sensor, an ambient light sensor, a processor, and storage. The storage comprises instructions executable by the processor to monitor an ambient light signal received from the ambient light sensor, detect, in combination with a call event, a threshold change in the ambient light signal that is indicative of the display device being proximate to a body of a user, and based at least on detecting the threshold change in the ambient light signal, modify an operation of the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a proximity sensor can be located behind a display bezel of a mobile communications device. However, mobile communications devices are trending toward smaller and smaller bezels (or even no bezels) to achieve larger active display areas. As the amount of space behind bezels continues to decrease, sensors are increasingly housed behind the display. However, locating a proximity sensor behind a display may pose various difficulties. For example, proximity sensors that utilize infrared (IR) emitters, when located behind organic light emitting diode (OLED) displays, may create an undesired blinking artifact as a result of IR light interacting with the OLED emitters and/or emitter drive circuitry. This blinking artifact appears in phase with the operation of the IR proximity sensor. In some examples, the pulse width of the IR emitter may be adjusted, or the use of multiple lower-voltage IR emitters may be used in place of a single higher-voltage IR emitter, in order to help reduce the blinking effect. However, such solutions do not completely remove the blinking artifact.

Accordingly, examples are disclosed herein that relate to the use of an ambient light sensor for proximity detection in a mobile communications device comprising a display, without the use of a separate proximity sensor and thus an IR emitter for proximity detection. The term "display device" is used herein to refer to a mobile communications device comprising a display, as well as other display devices that may utilize an ambient light sensor in the manner described herein. Using the ambient light sensor for proximity sensing avoids blinking artifacts arising from a proximity sensor IR emitter positioned behind an OLED display. Further, the use of an ambient light sensor for proximity detection may help to conserve power, reduce cost of production, and allow for a smaller overall device size, regardless of the display type, compared to devices that include a proximity sensor. The ambient light sensor may be located behind an OLED display or behind a device display bezel.

Figure 1:
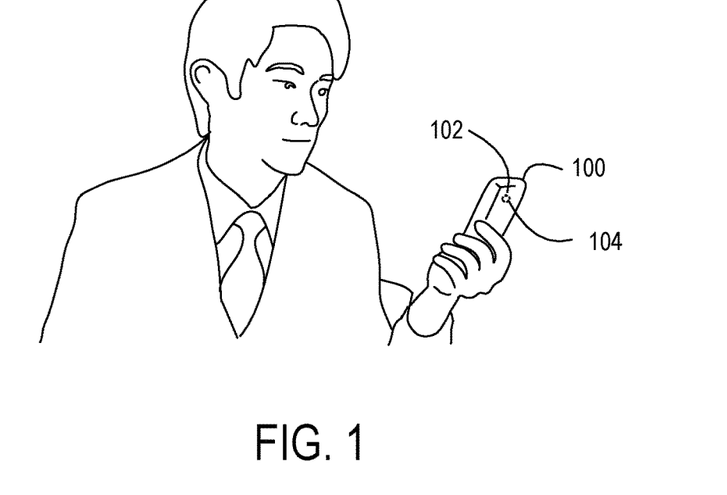
FIG. 1 shows an example display device comprising an ambient light sensor.

FIG. 1 shows an example display device 100 in the form of a smart phone that has a display panel 102 and an ambient light sensor 104. The ambient light sensor may be configured to detect ambient light levels and/or ambient color intensity at one or more selected wavelengths or wavelength bands, and may be located behind the display panel 102, behind a bezel, or at another location. In some examples, a display device may comprise more than one ambient light sensor. An ambient light sensor may take the form of a photoresistor, photodiode, phototransistor, and/or any other suitable light-sensing technology.

During an incoming or outgoing phone call, as the display device 100 is moved toward the user's face, the display device 100 can be configured to detect a threshold change in the ambient light signal that indicates a proximity of the display device 100 to the user. The term "threshold change" as used herein indicates any suitable change in ambient light signal that exceeds a defined threshold. In some examples, a threshold change comprises a change to an ambient light signal value that meets or falls below a threshold value, or that meets or exceeds a threshold value. Likewise, in some examples, a threshold change indicates a change in which a value after the change meets or exceeds a threshold difference or percentage change compared to a value before the change. Once the user ends the call and brings the display device 100 away from the face, the ambient light sensor signal likewise can be used to determine that the display device 100 has been moved away from the user's face. The use of the ambient light sensor for proximity detection may allow the omission of a separate proximity sensor, and thus help to avoid flashing arising from excitation of OLED display pixels by a proximity sensor emitter. Further, the omission of a proximity sensor also may help to achieve a smaller size, lower power consumption, and lower cost of production compared to devices that incorporate a proximity sensor. While disclosed in the context of an OLED display device, ambient light sensors can be used to detect proximity in other types of display devices as well, such as liquid crystal display (LCD) devices.

Figure 2:
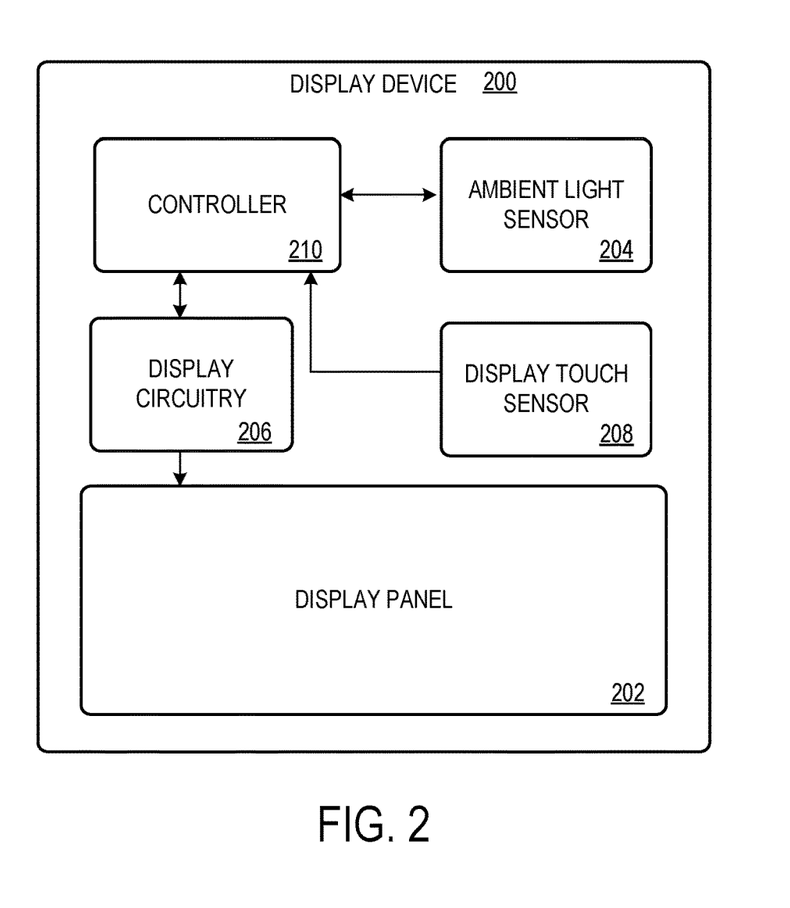
FIG. 2 shows a block diagram of an example display device.

FIG. 2 shows a block diagram of an example display device 200 suitable for use as display device 100. Display device 200 comprises a display panel 202, an ambient light sensor 204, and display circuitry 206. Display panel 202 may be an OLED display panel, for example. Display circuitry 206 is configured to control the display of images by controlling emission of light by pixels of the display panel 202, and may include any suitable circuitry.

Display device 200 further comprises a display touch sensor 208. Display touch sensor 208 can be positioned in front of the display panel 202 from a user perspective, or integrated into the display panel 202. Display device 200 further comprises a controller 210 configured to control an operation of the ambient light sensor 204, display circuitry 206, and display touch sensor 208, and to receive signals from the ambient light sensor 204 and display touch sensor 208. The controller 210 can be implemented via a processor, a microprocessor, FPGA, ASIC, and/or other suitable logic computational device.

Figure 3:
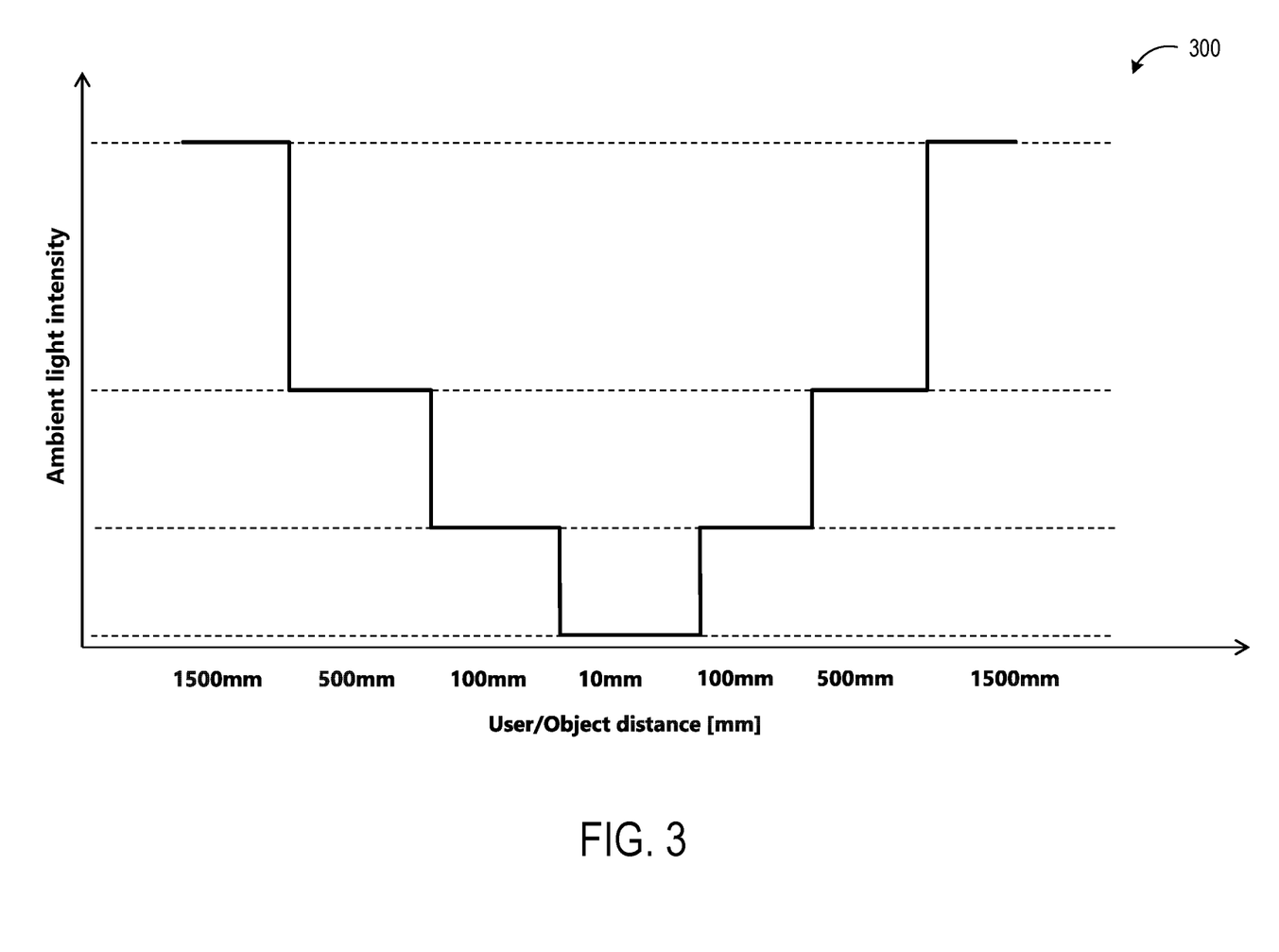
FIG. 3 shows a graph depicting an example ambient light sensor signal as a function of proximity to a user's face in a light room setting.

FIG. 3 shows a graph 300 representing an example ambient light sensor signal intensity (in arbitrary units) as a function of user distance (in millimeters) from a display device comprising the sensor in a light room setting over time. The display device can be a smart phone, and the distance can represent the distance of a face of the user to the smart phone. As the user moves the display device toward their face, e.g. from 1500 mm away to 10 mm, the ambient light signal decreases in intensity. Likewise, as the user moves the display device away from their face, the ambient light signal increases in intensity. These effects are due to ambient light being blocked by the user's body as the display device is brought closer to the user's face, allowing less light from reaching the ambient light sensor on the display device, and likewise allowing more ambient light to reach the ambient light sensor as the device is moved away from the face. In view of this effect, the display device can be configured to detect a threshold decrease in the ambient light signal to determine if the device is a threshold distance away from the user's face.

Figure 4:
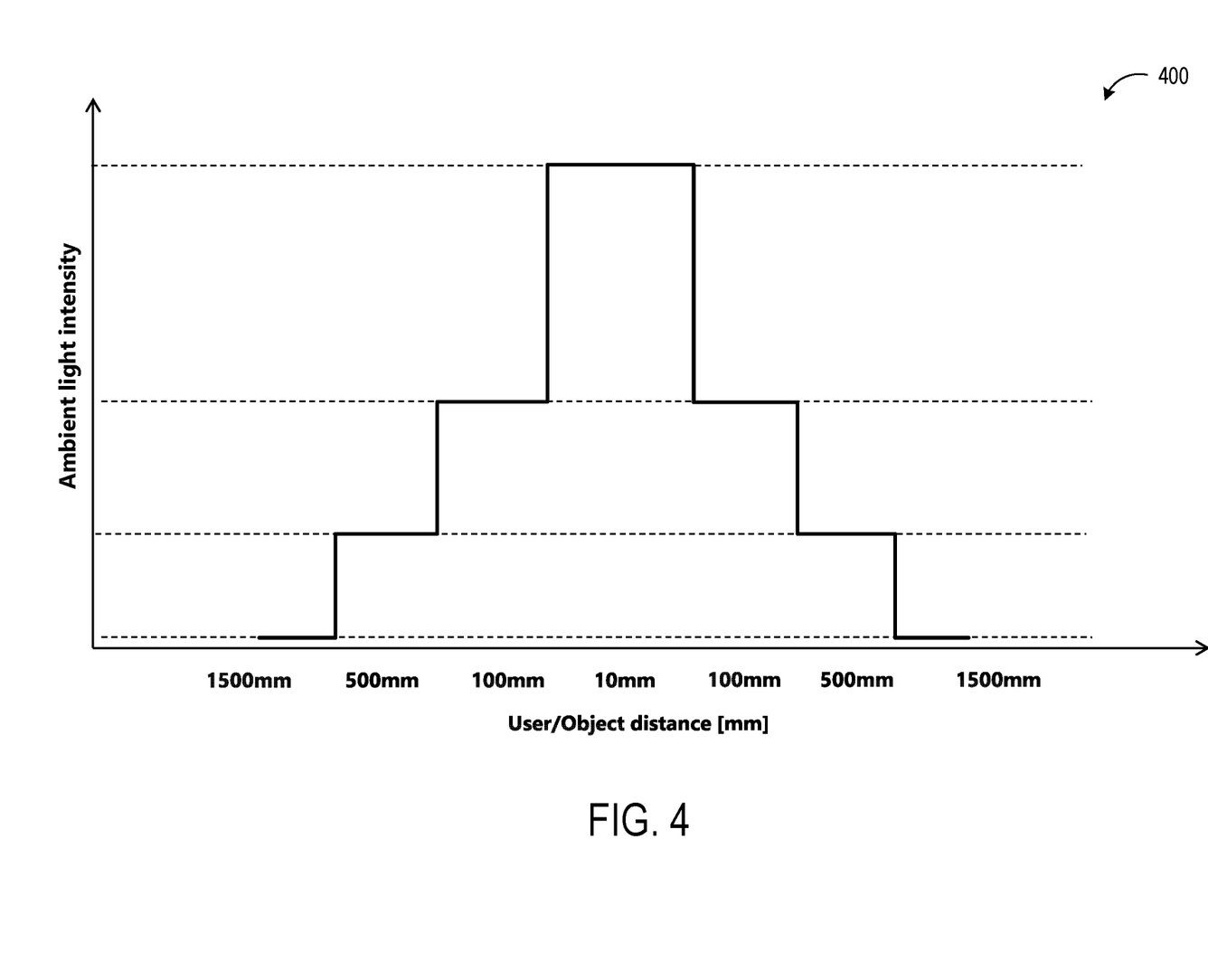
FIG. 4 shows a graph depicting an example ambient light sensor signal as a function of proximity to a user's face in a dark room setting.

In the example of FIG. 3, the signal from the ambient light sensor decreases as the device approaches the user. In contrast, in a dark setting, an ambient light signal may increase as a display device is brought closer to a user's face. FIG. 4 shows a graph 400 representing an example ambient light sensor signal intensity (in arbitrary units) as sensed by an ambient light sensor in a dark room setting over time. Here, as the user moves toward the display device from a distance, e.g. from 1500 mm away to 10 mm, the ambient light signal increases with decreasing distance. Likewise, as the user moves away from the display device, the ambient light signal decreases with increasing distance. In a dark room, where ambient light levels are low, light from the display may reflect from the user's body back toward the device, causing more light to be detected by the ambient light sensor. Here, a threshold increase in the ambient light signal may indicate that a user's body is proximate to the display device. As such, either a threshold decrease or a threshold increase in the ambient light signal may be used to determine that a user body is proximate to the display device, depending upon ambient light conditions in a current environment.

The representations shown in FIGS. 3 and 4 have steps in intensity that indicate, for example, movement of a device toward a user followed by pauses at the distances shown on the x-axis, such as a user glancing at a display from a distance, then holding the display closer to examine the display more closely, and then taking a call by holding the device close to or against their face. A graph representing a smoother motion of a device toward a face may have a different intensity profile.

In some examples, additional data may be used in combination with a threshold change in the ambient light signal to determine whether to adjust an operating state of the display device. For example, the display device may detect a threshold change in the ambient light signal in combination with detecting a touch interaction with a phone user interface displayed on the display, image data from a device camera indicating that the device is being moved toward a user, and/or other peripheral sensors e.g. AGMB (accelerometer, gyroscope, magnetometer and barometer) that can indicate phone movement to different directions or altitudes.

Any suitable change may be made to the operating state of a display device in response to detecting a threshold change in an ambient light signal. Examples include reducing a brightness of the display, disabling the display, disabling a touch sensor (both to conserve power and to prevent inadvertent touch inputs), and/or reducing an intensity of a radiofrequency communications signal emitted by the display device.

In some examples, an ambient light sensor may sense light at multiple channels corresponding to different wavelength bands. Multi-channel sensing may help to provide more consistent and/or accurate proximity sensing in different lighting environments. For example, natural sunlight is full spectrum, whereas different forms of artificial lighting may emit at specific wavelength bands. Sensing light at different selected wavelengths may help to detect changes in light intensity in many different lighting conditions more accurately than sensing at a single wavelength band.

Figure 5:
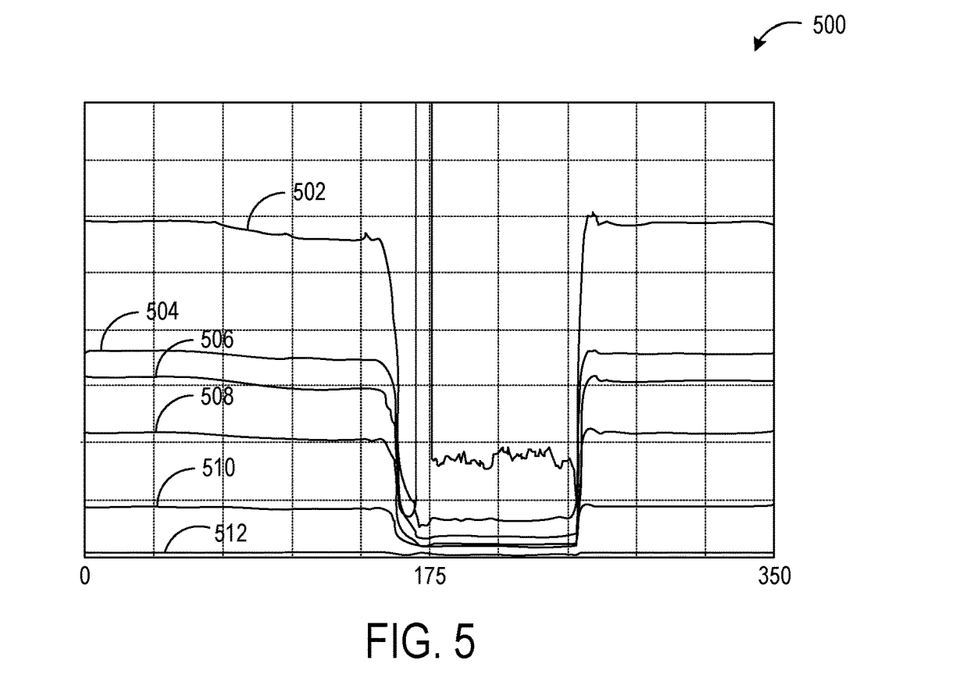
FIG. 5 shows a graph depicting experimental ambient light sensor signals at selected wavelengths in a light room setting as a device comprising the sensor is moved closer to and farther from a user's face.

FIG. 5 shows a graph 500 depicting observed multi-channel ambient light signals as a device comprising an ambient light sensor is brought closer to, and then farther from, a user's body in a light room setting. Line 502 represents a wide visible spectrum clear channel, 504 represents a reference wide spectrum (including IR) channel, 506 represents a red channel, 508 represents a green channel, 510 represents a blue channel, and 512 represents leakage/crosstalk measurements across all channels. The vertical axis is signal intensity, while the horizontal axis is time. In some examples, a second IR channel alternatively or additionally may be used for ambient light detection.

From these data, it can be seen that when the ambient light sensor is moved closer to the user, the ambient light signal intensity drops across all channels as the user shades the ambient light sensor. In this example, the drop-off occurred from a change in user distance between 10 cm to 1 cm from the display device. The large spike in the signal 504 for the wide spectrum (including IR) channel may be related to the presence and operation of a proximity sensor in the device that was tested.

Figure 6:
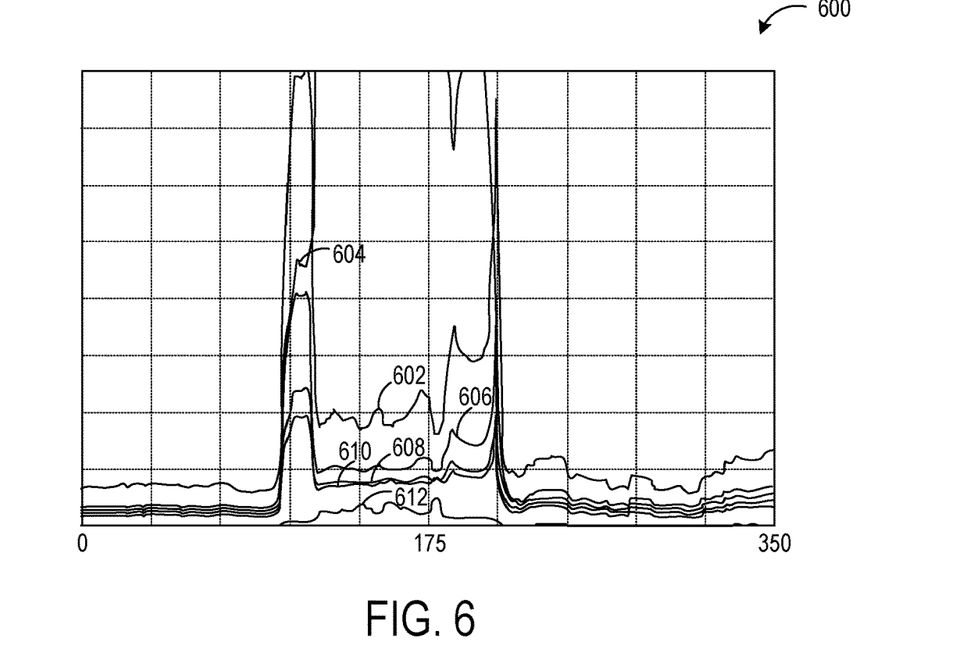
FIG. 6 shows a graph depicting experimental ambient light sensor signals at selected wavelengths in a dark room setting as a device comprising the sensor is moved closer to and farther from a user's face.

FIG. 6 shows a graph depicting observed multi-channel ambient light signals as a device comprising an ambient light sensor is brought closer to, and then farther from, a user's body in a dark room setting. Again, the vertical axis is signal intensity, while the horizontal axis is time. In FIG.

6, 602 represents a wide visible spectrum clear channel, 604 represents a reference wide spectrum (including IR) channel, 606 represents a red channel, 608 represents a green channel, 610 represents a blue channel, and 612 represents leakage measurements across all channels. In a dark room, as the ambient light sensor is moved closer to the user's body, light emitted from the display device is reflected from the user back to the ambient light sensor. As shown in each of these graphs, a light signal increase is detected over all channels when the user moves from 10 cm away to 1 cm away from the display device.

Figure 7:
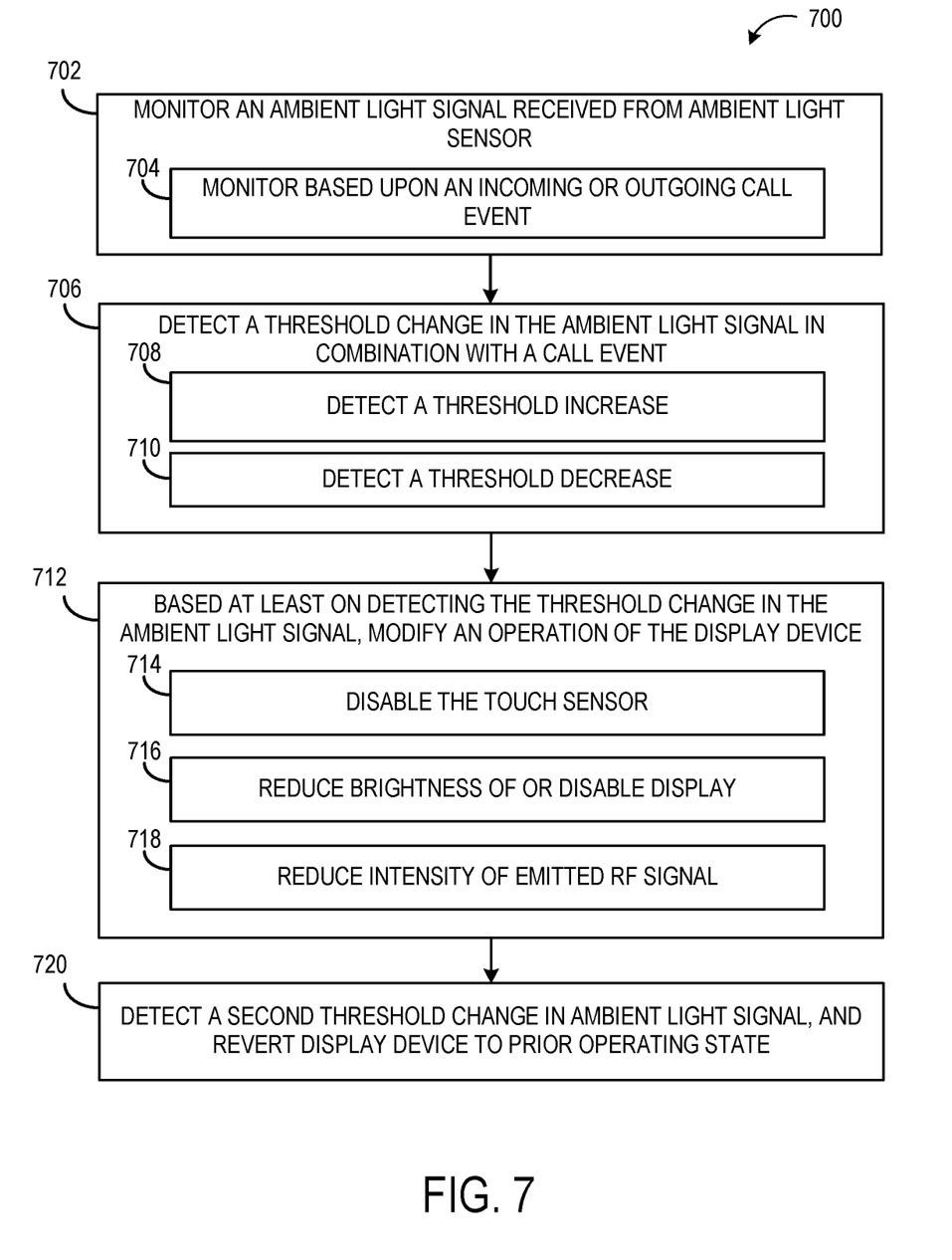
FIG. 7 shows a flow diagram depicting an example method of detecting user proximity to a display device.

FIG. 7 shows an example method 700 for detecting a proximity of a display device to a user based upon an ambient light sensor signal. Method 700 can be enacted on a display device, such as display devices 100 and 200. Method 700 includes, at 702, monitoring an ambient light sensor signal received from an ambient light sensor. As indicated at 704, in some examples, the signal may be monitored continuously, while in other examples the monitoring may be triggered by an event such as an incoming or outgoing phone call. Method 700 further includes, at 706, detecting a threshold change in the ambient light signal that is indicative of the display device being proximate to a body of a user, in combination with a call event (e.g. an incoming or outgoing phone call). The term "threshold change" as used herein again indicates any suitable change in ambient light signal that exceeds a defined threshold. In some examples, a threshold change comprises a change to an ambient light signal value that meets or falls below a threshold value, or that meets or exceeds a threshold value. Likewise, in some examples, a threshold change indicates a change in which a value after the change meets or exceeds a threshold difference or percentage change compared to a value before the change. The threshold change can be a threshold increase, at 708, or a threshold decrease, at 710. As described above, the ambient light sensor may detect a threshold increase in the ambient light signal as indicating user proximity to the display device when in a dark room setting. The ambient light sensor may also detect a threshold decrease in the ambient light signal as indicating user proximity to the display device when in a light room setting. In some examples, the display device may determine whether to utilize a threshold increase or a threshold decrease in the ambient light signal based upon ambient light data sampled, for example, when an incoming or outcoming call occurs. The sensed ambient light level indicates whether a light room setting or a dark room setting applies, and an appropriate threshold can be selected based upon the sensed ambient light level. In other examples, the display device may compare the ambient light signal to both thresholds.

Method 700 further includes, at 712, based at least on detecting the threshold change in the ambient light signal, modifying an operation of the display device. Modifying an operation may include, at 714, disabling the touch sensor, at 716, reducing a brightness of or disabling the display, and/or, at 718, reducing an intensity of a radiofrequency signal output by the display device. Such modifications may help to conserve device power. Further, disabling the touch sensor also may help to avoid inadvertent touch inputs. In other examples, any other suitable operating state of the display device may be modified.

In some examples, other data may be used in combination with the ambient light sensor signal to determine whether the display device is proximate to a user's body. For example, touch sensor data associated with the call event (e.g. a touch made to initiate an outgoing call, to answer an incoming call, or detecting a user ear shape or face (e.g. a large blob) by the touch sensor when it gets close to the user's face) may be used.

Method 700 further includes, at 720, detecting a second threshold change in the ambient light signal, for example a change that indicates the user's body is no longer proximate to the display device, and reverting the display device to a prior operating state. For example, the display device may enable the touch sensor, restore the brightness of or enable the display, and/or restore the radio frequency output signal.

In some examples, the methods and processes described herein may be tied to a computing system of one or more computing devices. In particular, such methods and processes may be implemented as a computer-application program or service, an application-programming interface (API), a library, and/or other computer-program product.

Figure 8:
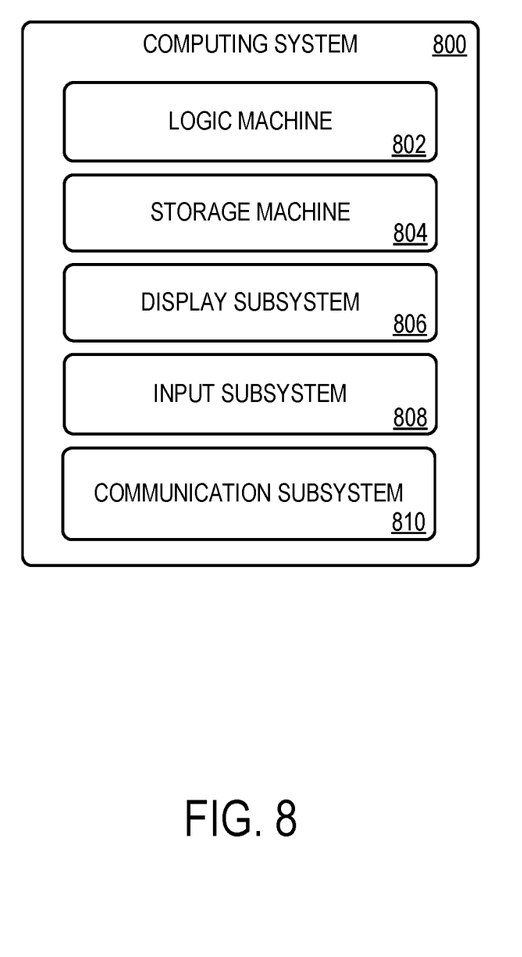
FIG. 8 shows a block diagram of an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine 802 may be configured to execute instructions that are part of one or more applications, services, programs, routines, libraries, objects, components, data structures, or other logical constructs. Such instruction may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine 802 may include one or more hardware or firmware logic machines configured to execute hardware or firmware instructions. Processors of the logic machine 802 may be single-core or multi-core, and the instructions executed thereon may be configured for sequential, parallel, and/or distributed processing. Individual components of the logic machine 802 optionally may be distributed among two or more separate devices, which may be remotely located and/or configured for coordinated processing. Aspects of the logic machine 802 may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem 810 may be configured for communication via a wireless telephone network, or a wired or wireless local- or wide-area network. In some embodiments, the communication subsystem may allow computing system 800 to send and/or receive messages to and/or from other devices via a network such as the Internet.

Another examples provides a display device configured for mobile communications, the display device comprising a display panel, a touch sensor, an ambient light sensor, a processor, and storage comprising instructions executable by the processor to monitor an ambient light signal from the ambient light sensor, detect, in combination with a call event, a threshold change in the ambient light signal that is indicative of the display device being proximate to a body of a user, and based at least on detecting the threshold change in the ambient light signal modify an operation of the display device. The instructions may additionally or alternatively be executable to modify the operation of the display device by disabling the touch sensor. The instructions may additionally or alternatively be executable to modify the operation of the display device by reducing a brightness of or disabling the display. The instructions may additionally or alternatively be executable to modify the operation of the display device by reducing an intensity of an RF signal output by the display device. The threshold change may additionally or alternatively include a threshold increase in the ambient light signal. The threshold change may additionally or alternatively include a threshold decrease in the ambient light signal. The display panel may additionally or alternatively include an OLED display panel. The instructions may additionally or alternatively be executable to detect the threshold change in the ambient light signal in combination with detecting a touch via the touch sensor, the touch being associated with the call event.

Another example provides a method enacted on a display device configured for mobile communications, the display device comprising a display panel and an ambient light sensor, the method comprising monitoring an ambient light signal received from the ambient light sensor, detecting, in combination with a call event, a threshold change in the ambient light signal that is indicative of the display device being proximate to a body of a user, and based at least on detecting the threshold change in the ambient light signal, modifying an operation of the display device. Modifying the operation of the display device may additionally or alternatively include disabling the touch sensor. Modifying the operation of the display device may additionally or alternatively include reducing a brightness of or disabling the display. Modifying the operation of the display device may additionally or alternatively include reducing an intensity of an RF signal output by the display device. The threshold change may additionally or alternatively include a threshold increase in the ambient light signal or a threshold decrease in the ambient light signal. The method may additionally or alternatively include detecting the threshold change in the ambient light signal in combination with detecting a touch via the touch sensor, the touch being associated with one or more of a call user interface and a user ear or face shape. The method may additionally or alternatively include detecting the threshold change in the ambient light signal in combination with one or more of accelerometer, gyroscope, magnetometer, and barometer signals indicating movement of the display device.

Another example provides a display device configured for mobile communications, comprising a display panel, a touch sensor, an ambient light sensor, a processor, and storage comprising instructions executable by the processor to monitor an ambient light signal received from the ambient light sensor, detect a threshold change in the ambient light signal, and based at least on detecting the threshold change in the ambient light signal, disable the touch sensor. The instructions are further executable to detect a second threshold change in the ambient light signal, and in response enable the touch sensor. The instructions may additionally or alternatively be executable to reduce a brightness of or disable the display based at least on detecting the threshold change in the ambient light signal. The threshold change may additionally or alternatively include a threshold increase in the ambient light signal. The threshold change may additionally or alternatively include a threshold decrease in the ambient light signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device configured for mobile communications, the display device comprising:
    an OLED display panel;
    a touch sensor;
    an ambient light sensor located behind the OLED display panel;
    a processor; and
    storage comprising instructions executable by the processor to
        monitor an ambient light signal from the ambient light sensor,
        determine whether the display device is in a dark room setting or a light room setting, the dark room setting comprising a setting in which the ambient light signal increases in intensity as the display device is moved closer to a face, and the light room setting comprising a setting in which the ambient light signal decreases in intensity as the display device is moved closer to the face,
        select a threshold based on the ambient light signal, wherein selecting the threshold comprises determining whether to compare an increase in the ambient light signal to a threshold increase based at least on a determination that the display device is in the dark room setting, or compare a decrease in the ambient light signal to a threshold decrease based at least on a determination that the display device is in the light room setting,
        detect, in combination with a call event and based at least on the threshold selected, a threshold change in the ambient light signal that is indicative of the display device being proximate to a body of a user, and
        based at least on detecting the threshold change in the ambient light signal, modify an operation of the display device.

2. The display device of claim 1, wherein the instructions are executable to modify the operation of the display device by disabling the touch sensor.

3. The display device of claim 1, wherein the instructions are executable to modify the operation of the display device by reducing a brightness of or disabling the OLED display panel.

4. The display device of claim 1, wherein the instructions are executable to modify the operation of the display device by reducing an intensity of an RF signal output by the display device.

5. The display device of claim 1, wherein the instructions are further executable to detect the threshold change in the ambient light signal in combination with detecting a touch via the touch sensor, the touch being associated with the call event.

6. A method enacted on a display device configured for mobile communications, the display device comprising an OLED display panel and an ambient light sensor located behind the OLED display panel, the method comprising:
    monitoring an ambient light signal received from the ambient light sensor located behind the OLED display panel,
    determining whether the display device is in a dark room setting or a light room setting, the dark room setting comprising a setting in which the ambient light signal increases in intensity as the display device is moved closer to a face, and the light room setting comprising a setting in which the ambient light signal decreases in intensity as the display device is moved closer to the face,
    selecting a threshold based on the ambient light signal, wherein selecting the threshold comprises determining whether to compare an increase in the ambient light signal to a threshold increase based at least on a determination that the display device is in the dark room setting or compare a decrease in the ambient light signal to a threshold decrease based at least on a determination that the display device is in the light room setting,
    detecting, in combination with a call event and based at least on the threshold selected, a threshold change in the ambient light signal that is indicative of the display device being proximate to a body of a user, and
    based at least on detecting the threshold change in the ambient light signal, modifying an operation of the display device.

7. The method of claim 6, wherein modifying the operation of the display device comprises disabling a touch sensor of the display device.

8. The method of claim 6, wherein modifying the operation of the display device comprises reducing a brightness of or disabling the OLED display panel.

9. The method of claim 6, wherein modifying the operation of the display device comprises reducing an intensity of an RF signal output by the display device.

10. The method of claim 6, further comprising detecting the threshold change in the ambient light signal in combination with detecting a touch via a touch sensor, the touch being associated with one or more of a call user interface, a user ear shape, or a user face shape.

11. The method of claim 6, further comprising detecting the threshold change in the ambient light signal in combination with one or more of accelerometer, gyroscope, magnetometer, or barometer signals indicating movement of the display device.

12. A display device configured for mobile communications, comprising:
    an OLED display panel;
    a touch sensor;
    an ambient light sensor located behind the OLED display panel;
    a processor; and
    storage comprising instructions executable by the processor to
        monitor an ambient light signal received from the ambient light sensor,
        determine whether the display device is in a dark room setting or a light room setting, the dark room setting comprising a setting in which the ambient light signal increases in intensity as the display device is moved closer to a face, and the light room setting comprising a setting in which the ambient light signal decreases in intensity as the display device is moved closer to the face, select a threshold based on the ambient light signal, wherein selecting the threshold comprises determining whether to compare an increase in the ambient light signal to a threshold increase based at least on a determination that the display device is in the dark room setting or compare a decrease in the ambient light signal to a threshold decrease based at least on a determination that the display device is in the light room setting, based at least on the threshold selected, detect a threshold change in the ambient light signal, and based at least on detecting the threshold change in the ambient light signal, disable the touch sensor.

13. The display device of claim 12, wherein the instructions are further executable to detect a second threshold change in the ambient light signal, and in response enable the touch sensor.

14. The display device of claim 12, wherein the instructions are further executable to reduce a brightness of or disable the display based at least on detecting the threshold change in the ambient light signal.

\* \* \* \* \*